United States Patent
Baba et al.

(10) Patent No.: US 9,887,393 B2
(45) Date of Patent: Feb. 6, 2018

(54) BATTERY, METHOD OF FORMING A BATTERY CELL CONTAINER, AND ELECTRONIC DEVICE

(71) Applicants: Sony Corporation, Tokyo (JP); Sony Electronics (Wuxi) Co., Ltd., Jiangsu Province (CN)

(72) Inventors: Mamoru Baba, Fukushima (JP); Ken Moriuchi, Jiangsu (CN); Hiroshi Seino, Fukushima (JP)

(73) Assignee: Murata Manufacturing Co., Ltd., Kyoto (JP)

(*) Notice: Subject to any disclaimer, the term of this patent is extended or adjusted under 35 U.S.C. 154(b) by 1270 days.

(21) Appl. No.: 13/654,122

(22) Filed: Oct. 17, 2012

(65) Prior Publication Data
US 2013/0101894 A1    Apr. 25, 2013

(30) Foreign Application Priority Data
Oct. 24, 2011    (CN) .......... 2011 1 0327981

(51) Int. Cl.
*H01M 2/02* (2006.01)
*H01M 10/04* (2006.01)

(52) U.S. Cl.
CPC ......... *H01M 2/0202* (2013.01); *H01M 2/022* (2013.01); *H01M 2/0217* (2013.01); *H01M 2/0267* (2013.01); *H01M 10/0436* (2013.01); *H01M 2/0275* (2013.01); *H01M 2/0287* (2013.01)

(58) Field of Classification Search
CPC .................................... H01M 2/02
See application file for complete search history.

(56) References Cited

U.S. PATENT DOCUMENTS 6,358,644 B1    3/2002    Shibata et al.
2007/0202398 A1*   8/2007   Kim .............. H01M 2/021
                                                    429/176

FOREIGN PATENT DOCUMENTS

| CN | 1253387 | 5/2000 | |
|---|---|---|---|
| CN | 1992380 | 7/2007 | |
| CN | 202474064 | 10/2012 | |
| JP | 2004-031194 | 1/2004 | |
| JP | 2004031194 | * 1/2004 | ............ H01M 2/02 |

OTHER PUBLICATIONS

Chinese Office Action dated Aug. 20, 2014, for corresponding Chinese Appln. No. 201110327981.7.

* cited by examiner

*Primary Examiner* — Sarah A Slifka
(74) *Attorney, Agent, or Firm* — K&L Gates LLP

(57) ABSTRACT

The present invention provides a battery, a method of forming a battery cell container, and an electronic device. The battery of the present invention comprises: a battery cell, and a battery cell container composed of two folded container portions formed by stretching in one thin sheet, wherein, in each container portion, among the planes where the walls of each container exist, at least two planes are inclined to the plane where the thin sheet section for forming the container portion exists. Through the implementation of the present invention, a larger volume of battery container can be obtained with the same or less material as well as easy positioning.

18 Claims, 14 Drawing Sheets

--Prior Art--

--Prior Art--

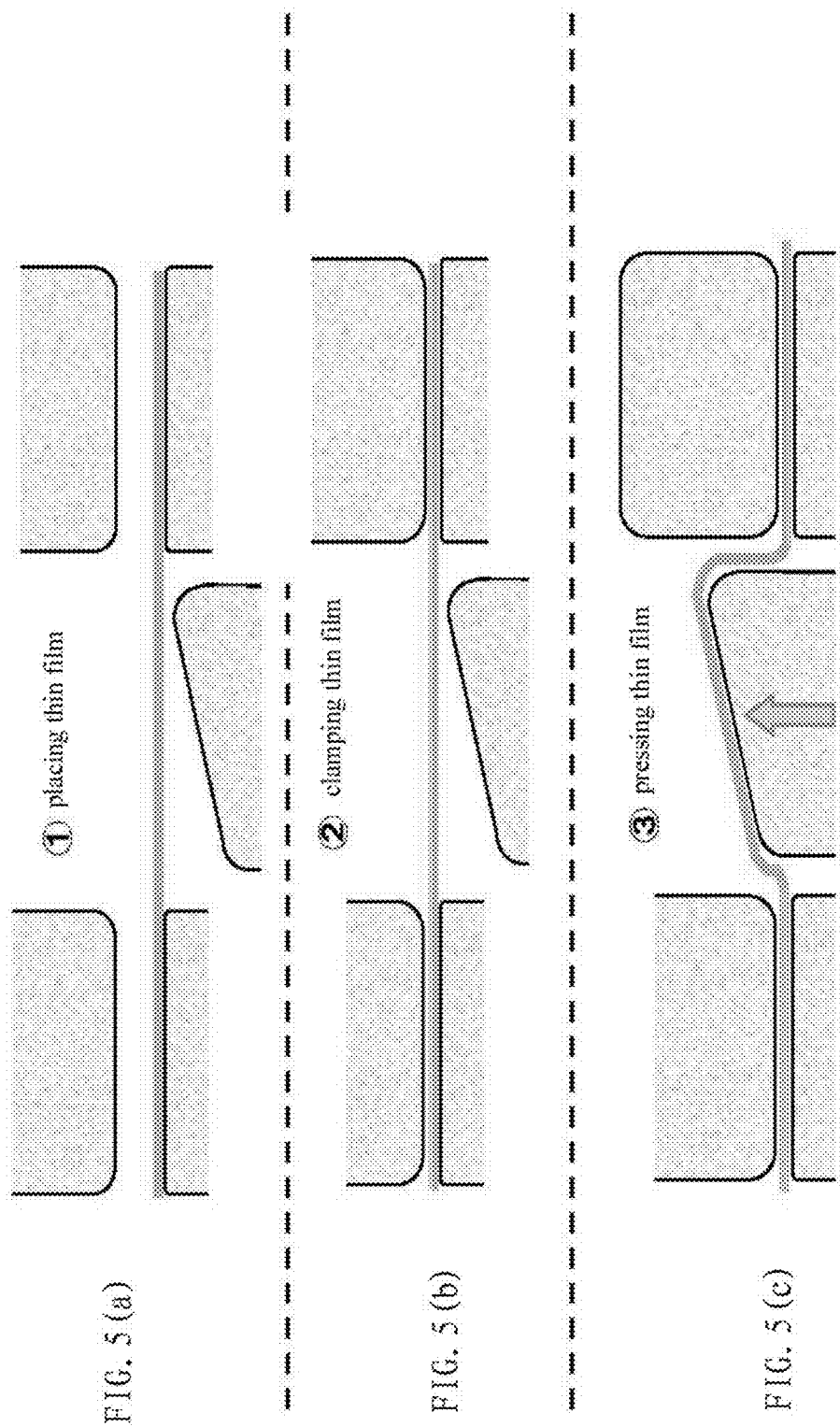
FIG. 5(a) ① placing thin film
FIG. 5(b) ② clamping thin film
FIG. 5(c) ③ pressing thin film

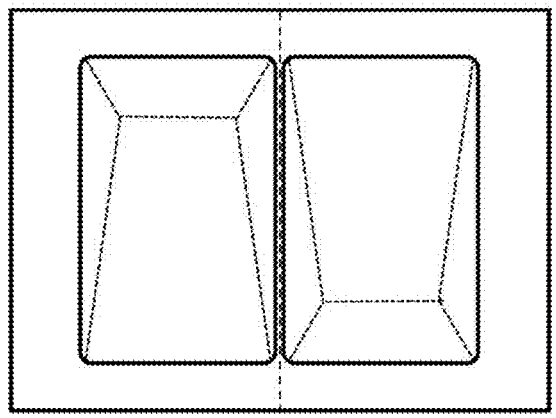 
FIG. 8 (a)  FIG. 8 (b)
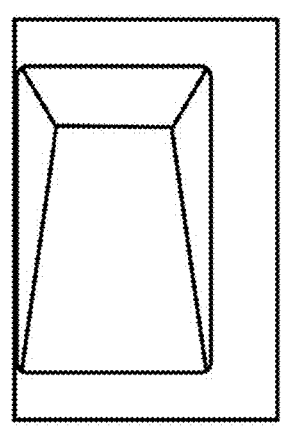 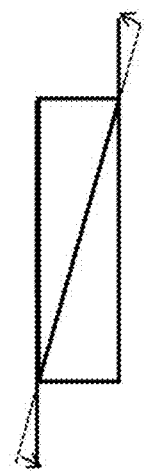
FIG. 8 (c)  FIG. 8 (d)

FIG. 11 (a)        FIG. 11 (b)
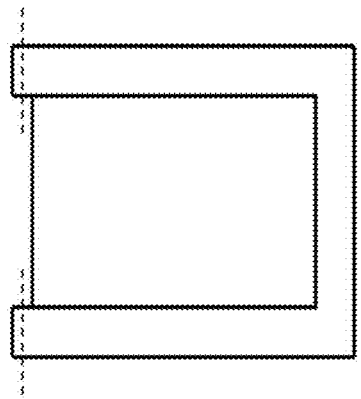
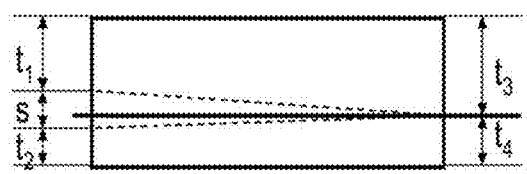
FIG. 11 (c)        FIG. 11 (d)

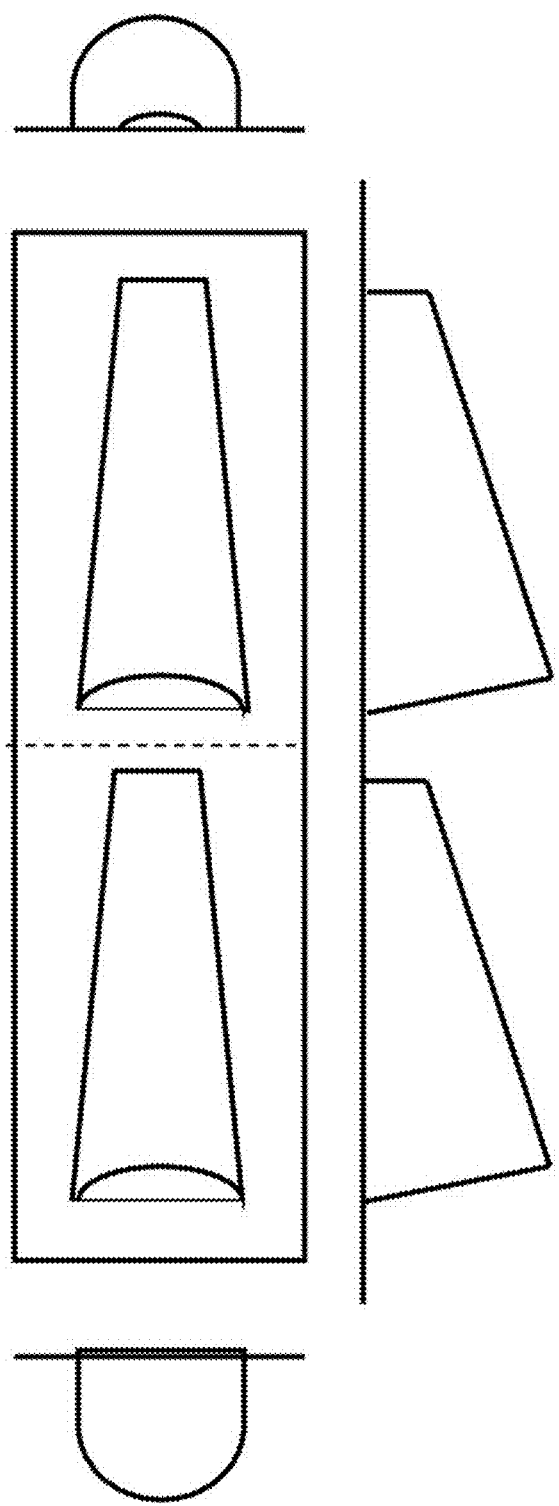

BATTERY, METHOD OF FORMING A BATTERY CELL CONTAINER, AND ELECTRONIC DEVICE

CROSS REFERENCES TO RELATED APPLICATIONS

The present application claims priority to Chinese Priority Patent Application CN 201110327981.7 filed in the State Intellectual Property Office of the People's Republic of China on Oct. 24, 2011, the entire content of which is hereby incorporated by reference.

BACKGROUND

The present invention relates to a battery, a method of forming a battery cell container, and an electronic device.

In recent years, portable devices, represented by digital cameras and mobile phones, have been widely popularized. With popularization of various portable devices, their performances also have been rapidly improved. With additions of various functions, power consumption of a portable device has been gradually increased, as well. Therefore, it becomes a widely concerned subject in the industry on how to improve the electricity storage capacity of a battery to enable a portable device to have extended standby time.

At present, a battery of a general portable device commonly adopts a following structure. With a polymer lithium-ion secondary battery as an example, a positive electrode is formed by laying a layer of active materials consisting of $LiCoO_2$ and zinc on a positive electrode collector made of aluminum foil. A negative electrode is formed by laying a layer of active materials consisting of, for example, carbon, coke, graphite and the like, on a negative electrode collector. By inserting one porous-film separator composed of polypropylene or polyethylene between the negative and the positive collectors, and filling polymer gel electrolyte between the electrodes and the separator, thus a sandwich-like battery cell is formed. Through encapsulating the battery cell with a container, a battery pack is formed.

As to the methods of forming the above-mentioned container, for example, a method in a first existing way recorded in CN1253387A is commonly adopted. FIG. 1(a) and FIG. 1(b) are schematic views of the molding method of a battery cell container in the first existing way. As shown in FIG. 1, a rectangular sheet-like substrate is evenly divided into a region 3a for forming a container main body and a region 3b for covering a battery cell accommodated in the container. In the region 3a, a cuboid battery cell container 6 is formed by a compression molding method. By mounting a battery cell (not shown) in the container 6, and folding the region 3b toward the region 3a side, thereby covering the battery cell, thus the encapsulation of the container is completed.

In the above-described method of vertically forming a cuboid container on a rectangular sheet-like substrate, the sheet-like substrate is generally a laminated thin film composed of, for example, a polypropylene layer, an aluminum layer and a nylon layer. As shown in the schematic views of FIG. 2, when the thin film-like substrate is fixed and stretched by a stretching head (a metal mold) such as a stamping head or the like, since the ductility of the substrate itself has a certain limit (in particular, the aluminum layer therein), and there exists a great frictional force between the metal mold and the substrate as shown in FIG. 2(c), therefore, during the formation of the container, there exist such a case that the thin film-like substrate is stretched only at local parts (such as the substrate part at both sides of the metal mold conducting the stretching), as a result, there inevitably exists a certain physical limit to the stretching depth (molding depth). Consequently, it becomes a difficult problem to improve the molding depth on condition of not increasing material consumption.

In order to solve the above problem, a method in a second existing way is proposed. FIG. 3(a) and FIG. 3(b) are schematic views of the molding method of a battery cell container in the second existing way. As shown in FIG. 3(a) and FIG. 3(b), the method comprises: dividing one container originally formed on the sheet-like substrate into two portions, and molding the two container portions by vertically stretching on the sheet-like substrate, then folding to form a battery cell container. In this method, through dividing a container into two portions to be stretched, it solves to a certain extent, the problem that the molding depth is limited since the stretching limit exists. However, as shown in FIG. 2, in the case of stretching two container portions, because the material of the substrate part between the two container portions will also be stretched and hence used for molding parts of the walls of the two container portions, thus to some extent, the stretching limit is suppressed. Although it is possible to solve such problem by widening the width of the substrate part between the two container portions, it will bring a problem of material loss.

In addition, a method in a third existing way is disclosed in Japanese laid-open publication No. 2004-31194. FIG. 4 is a schematic view of the molding method of a battery cell container in the third existing way. As shown in FIG. 4, the method comprises: forming two container portions on two sheet-like substrates, respectively, and then oohering them together. In that invention, because the two container portions are respectively formed on two sheet-like substrates and then cohere together, there exists difficulties in positioning of the two container portions, moreover, the volume energy density is reduced due to the added sheet-like substrate part.

SUMMARY

The present invention is accomplished in view of the above-mentioned defects existing in the prior art, with an aim of providing a battery, a method of forming a battery cell container, and an electronic device, in which a larger volume of container can be obtained with the same or less material as well as easy positioning.

The battery of the present invention, comprising: a battery cell, and a battery cell container composed of two folded container portions formed by stretching in one thin sheet, characterized in that, in each container portion, among the planes where the walls of each container exist, at least two planes are inclined to the plane where the thin sheet section for forming the container portion exists.

The battery of the present invention, comprising: a battery cell, a battery cell container composed of two folded container portions formed by stretching in one thin sheet, and a protrusion portion, characterized in that, a defined distance is set on the thin sheet between the two container portions; in each container portion, among the planes where the walls of each container exist, at least one plane is inclined to the plane where the thin sheet section for forming the container portion exists; the two container portions are folded to form a substantial cuboid, and the thin sheet within the defined distance becomes a part of the wall at one side along the width direction of said cuboid, thus gaps are created on the side surfaces at both sides along the length direction of said cuboid between the planes where the thin sheet sections for forming the two container portions respectively exist; the side surfaces at the same side along the length direction in the two container portions are respectively stretched in a direction close to each other so as to eliminate the gaps, and through such stretching, the protrusion portion is formed on the wall at said one side along the width direction of said cuboid.

The battery of the present invention, comprising: a battery cell, and a battery cell container composed of two folded container portions formed by stretching in one thin sheet, characterized in that, in each container portion, among the planes where the walls of each container exist, at least one plane is inclined to the plane where the thin sheet section for forming the container portion exists.

The method of forming a battery cell container according to the present invention, characterized in that, it comprises: a step of forming container portions, in which two container portions are formed by stretching on one thin sheet respectively; and a step of forming a container, in which the two container portions are folded and then merged to form the container, wherein, in the step of forming container portions, the two container portions are formed respectively in such a way that, among the planes where the walls of each container exist, at least two planes are inclined to the plane where the thin sheet section for forming the container portion exists.

The method of forming a battery cell container according to the present invention, characterized in that, it comprises: a step of forming container portions, in which two container portions are formed by stretching on one thin sheet respectively; and a step of forming a container, in which the two container portions are folded and then merged to form the container, wherein, in the step of forming container portions, the two container portions are formed respectively in such a way that, among the planes where the walls of each container exist, at least one plane is inclined to the plane where the thin sheet section for forming the container portion exists.

The electronic device of the present invention, comprising: an electronic device main body and a battery supplying power to the electronic device main body, wherein, the battery comprises: a battery cell, and a battery cell container composed of two folded container portions formed by stretching in one thin sheet, wherein, in each container portion, among the planes where the walls of each container exist, at least two planes are inclined to the plane where the thin sheet section for forming the container portion exists.

The electronic device of the present invention, comprising: an electronic device main body and a battery supplying power to the electronic device main body, wherein, the battery comprises: a battery cell, and a battery cell container composed of two folded container portions formed by stretching in one thin sheet, wherein, in each container portion, among the planes where the walls of each container exist, at least one planes is inclined to the plane where the thin sheet section for forming the container portion exists.

Through introducing a wall which is not parallel to the molding surface, i.e. an inclined wall, into a battery cell container, the introduction and the extension of the aluminum layer is caused to go toward an advantageous direction, thus the aluminum layer will not be largely extended at local parts, thereby improving the molding depth.

Additional features and advantages are described herein, and will be apparent from the following Detailed Description and the figures.

BRIEF DESCRIPTION OF THE FIGURES

FIG. 5(a)-FIG. 5(c) illustrate the principle of the molding method of a battery cell container according to the present invention.

FIG. 8(a)-FIG. 8(d) are schematic views of a container formed in the second embodiment by the method of the present invention.

FIG. 11(a)-FIG. 11(d) are schematic views showing a case of slightly adjusting a container formed in the fourth embodiment by the method of the present invention.

FIG. 12 is a schematic view of a container formed in the fifth embodiment by the method of the present invention.

DETAILED DESCRIPTION

Figure 1A:
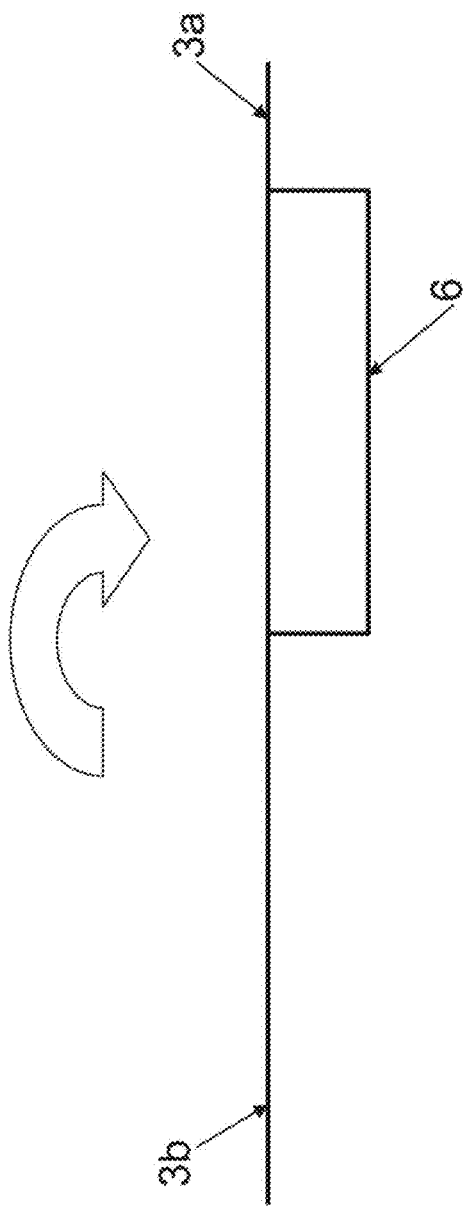
FIG. 1(a) and FIG. 1(b) are schematic views of the molding method of a battery cell container in the first existing way.

Hereinbelow, embodiments of the present invention will be described with reference to the accompanying drawings. In all of the accompanying drawings related to the embodiments, the like reference numerals indicate like or corresponding parts. In addition, specific values will be used in the following description of the embodiments, but as long as not stated otherwise, the values are only used to describe an example of the present invention, and the scope of protection of the present invention should not be limited thereto.

Below, a molding method of a battery cell container according to the present invention will be introduced with reference to FIG. 5. In addition, it should be noted that, although a battery cell container is divided into two battery-cell-container portions to be formed in the present invention, for the sake of simplicity, FIG. 5 shows only a molding method of one container portion as an example for explanation, and the other container portion may be formed by the same method as the one container portion simultaneously or separately. In addition, after formation of a battery, by folding the two battery container portions, thus the two molding surfaces are superposed onto one plane. As shown in FIG. 5(a), firstly, a thin film-like substrate (a thin sheet) is placed horizontally on a workbench. Then, as shown in FIG. 5(b), the periphery of the substrate is fixed, that is, the substrate part except for the substrate part that will form the battery-cell-container portions is fixed on the workbench. Then, as shown in FIG. 5(c), a stretching head such as a stamping head is moved in the vertical direction, thus a container portion is stretched out on the substrate.

Figure 2:
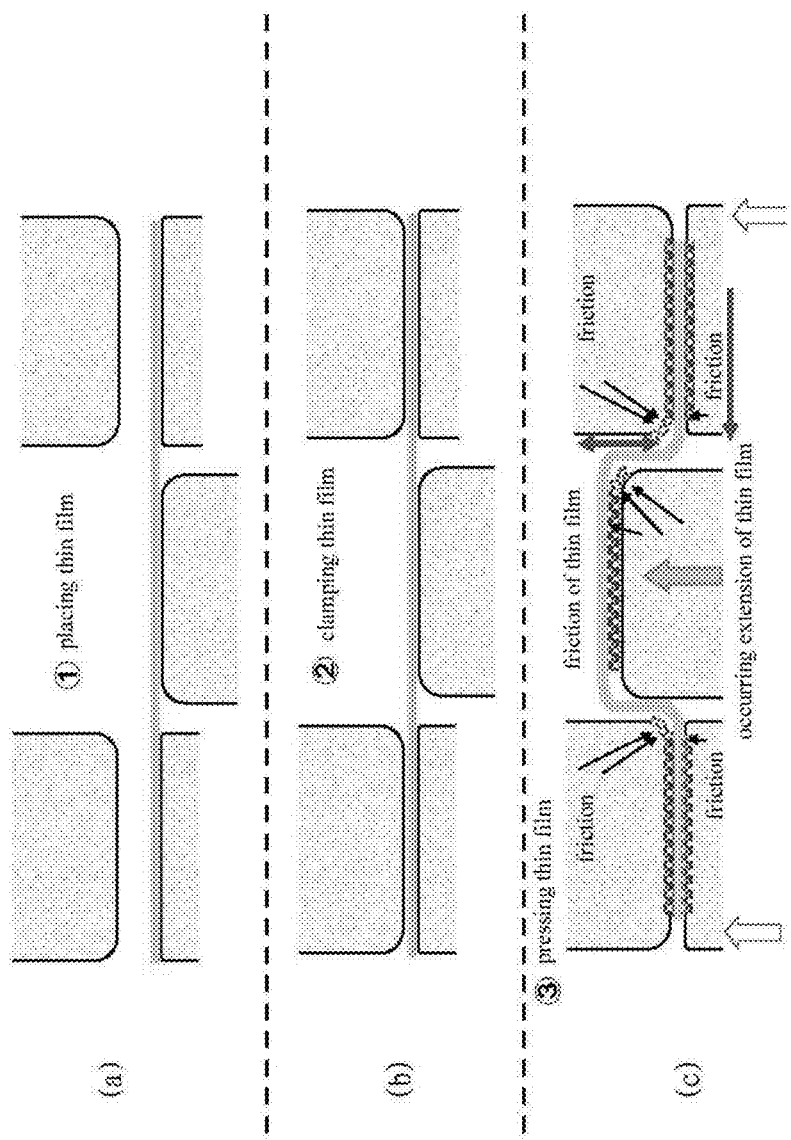
FIG. 2(a)-FIG. 2(c) illustrate the principle of the molding method of a battery cell container in the first existing way.
Figure 3A:
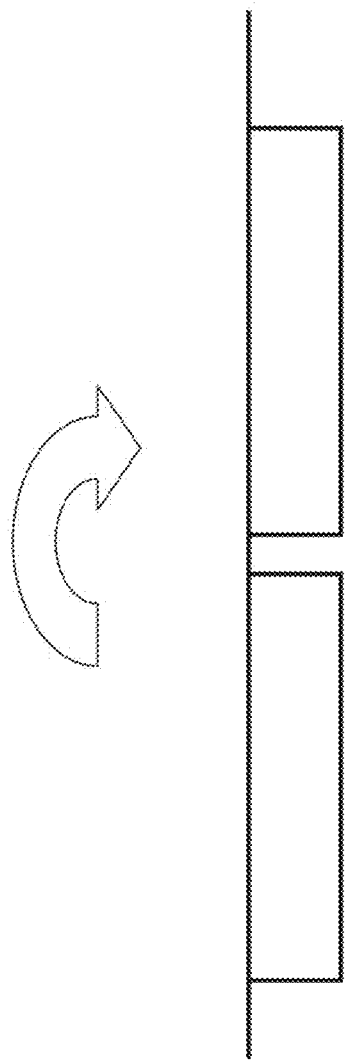
FIG. 3(a) and FIG. 3(b) are schematic views of the molding method of a battery cell container in the second existing way.
Figure 3B:
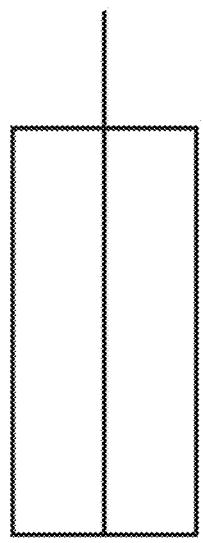
Figure 4:
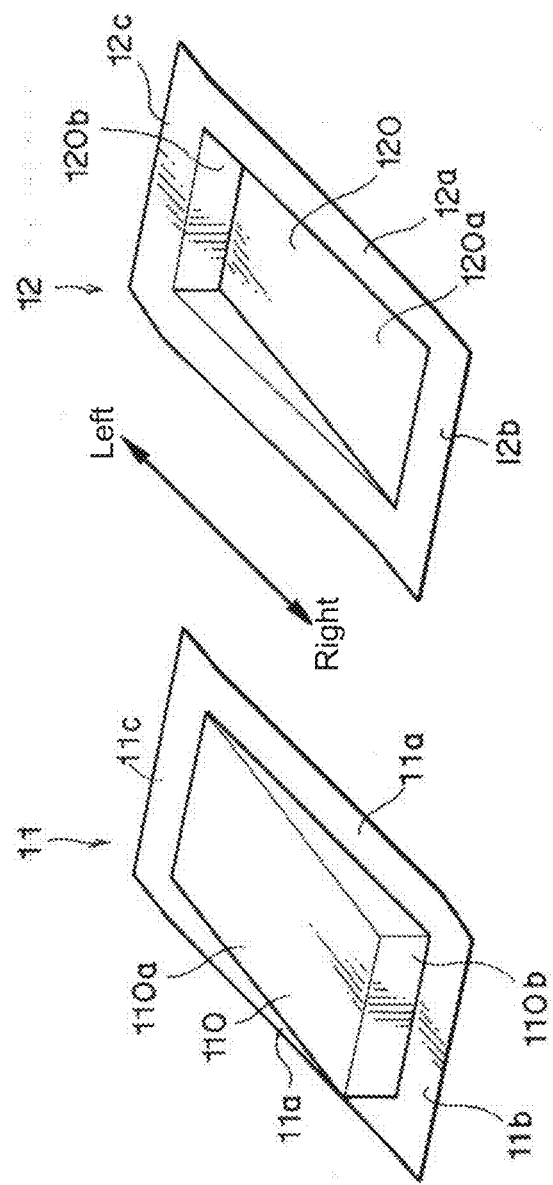
FIG. 4 is a schematic view of the molding method of a battery cell container in the third existing way.

In FIG. 5(c), it should be noted that, the end surface of the stretching head for conducting the stretching is not parallel to the plane where the thin film-like substrate exists, but at a certain angle to that plane, and in theory, as long as the angle is greater than 0 degree and less than 90 degrees, then the purpose of the present invention would be achieved. It is known by comparing FIG. 5(c) and FIG. 2(c) that, in the present invention, since the end surface of the stretching head is at a certain angle to the plane where the substrate exists, the stretching head is not moved to abut directly on the substrate as usual, instead the stretching head is brought into contact with the substrate as it is continuously moved forward, thus causing the container walls formed to be inclined at a certain angle to the plane where the substrate exists, i.e. the molding surface, with the angle being depended on the shape of the stretching head. As a result, there is no very large frictional force caused between the end surface of the stretching head and substrate, thus, compared with the usual, not only the substrate part at both sides of the stretching head is stretched, but also the substrate part where the end surface of the stretching head abuts is stretched, thus compared to the previous methods, the molding limit can further be improved.

In addition, the above shows, as an example, a case of moving the stretching head in the vertical direction, but the present invention is not limited to moving in that manner, nor limited to a profiled metal mold (stretching head), instead it can make use of an existing metal mold and adjust traveling directions and angles thereof to carry out a proper molding, so that at least a part of the end surface of the stretching head opposite to the thin sheet is inclined to the plane where the thin sheet of the substrate exists, thus a same effect as the present invention may likewise be achieved.

Through the above processing, in the formed container portions, the surface that directly contact with the stretching head becomes to have a inclined relationship with respect to the plane where the thin sheet for forming the container portion exists, i.e. the molding surface.

Below, the present invention will be described in connection with specific embodiments. The following description is intended to explain the present invention with approximate rectangular containers and approximate cylindrical containers as examples, but as long as the container can be formed by the above-described molding method so that they have inclined walls with respect to their molding surfaces, they all belong to the scope of protection of the present invention, regardless of their shapes. In addition, in the description, in the case of explaining rectangular containers, examples in which two container portions are formed in a height direction are described, however, according to the principle of the invention, it is certain that the two container portions also may be formed respectively in a length or width direction.

The First Embodiment

Figure 6A:
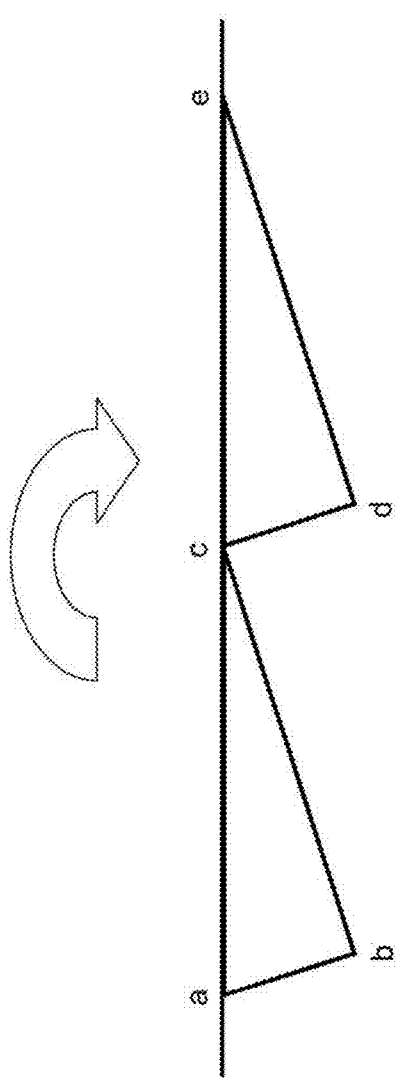
FIG. 6(a)-FIG. 6(c) are schematic views of a container formed in the first embodiment by the method of the present invention.
Figure 6C:
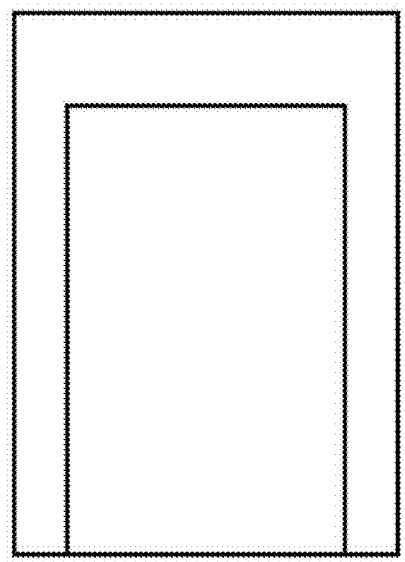
Figure 6B:
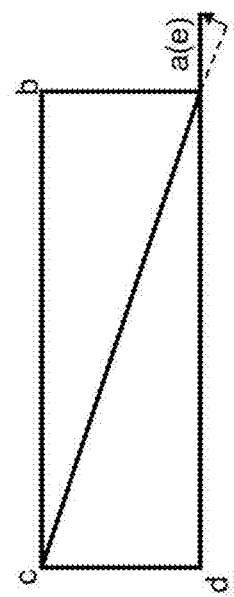

FIG. 6(a)-FIG. 6(c) are schematic views of a container formed in the first embodiment by the method of the present invention. The container formed by the method of the first embodiment of the present invention is approximately a cuboid container. It should be understood by the skilled in the art that, the "cuboid" used herein, in a broad sense, comprises cuboids having sides of different lengths, as well as cuboids having sides of same length, i.e. cubes. In the present invention, for convenience of explanation, a lengthwise direction, a central transversal section along the lengthwise direction, and a central longitudinal section along the lengthwise direction are defined in a container. A lengthwise direction refers to a direction of the longest depth in a geometry object, a direction of the longest side in a cuboid, and a direction of the centerline in a cylinder. A central transversal section along a lengthwise direction, refers to a section which is parallel to a lengthwise direction and passing through the center of a geometry object in the case that the geometry object is horizontally placed along its lengthwise direction. A central longitudinal section along a lengthwise direction, refers to a section which is perpendicular to the central transversal section along a lengthwise direction as above described and passing through the center of a geometry object. In addition, hereinbelow, the sections which are used to describe the sectional shapes of respective containers, are central longitudinal sections along a lengthwise direction in respective container portions. In addition, in the following embodiments, as long as not stated otherwise, the above-mentioned concepts have the same meaning.

FIG. 6(a) is a view of a container seen from one side along the width direction of the container, in the case that the two container portions are unfolded. FIG. 6(b) is a view of a container seen from one side along the width direction of the container, in the case that the two container portions are folded. As shown in FIG. 6(a), on a approximately rectangular sheet-like substrate, the substrate is divided along the left-to-right direction of the drawing into two regions, and on the two regions, two container portions are respectively formed. The sheet-like substrate for forming a battery cell container, is generally a thin film in a laminated structure comprising a metal layer such as aluminum layer. The thin film has ductility, therefore it can form each container portion when it is molded by stretching. The two container portions are folded, along the dividing line of the two regions, to each other toward the opening direction of the container portions, thus a cuboid container is formed. In this case, the positive and negative electrodes of the battery cell in the formed container are led out in a same direction, that is, the direction opposite to the folding line. Since the feature of the present invention lies in that, it is as far as possible to make the walls of the two container portions inclined to the surface of the substrate which forms each of the container portions, i.e. the molding surface, and make the substrate part be stretched to a maximum extent, therefore, in this case, the molding surface exist in the plane passing through the diagonals of the rectangular walls on both sides along the length direction of the cuboid container. Thus, as shown in FIG. 6(b), in the formed container, both the plane where "bc" and "ba" (or "be") in the upper container portion exist, and the plane where "cd" and "ad" (or "de") in the lower container portion exist, are inclined to the molding surface "ac" (or "ae"), respectively.

In addition, the container exemplified in this case is approximately a rectangular container, thus the apex angles of the sectional triangles of the two container portions are right angles, however, depending on the differences in designs of the batteries themselves or in designs of shapes of electronic devices installed with batteries, the apex angles may vary within a range rather than limited to the right angle, or may have a certain curvature due to chamfers of the mold. Thus, the battery cell container of the first embodiment is formed by folding the formed two container portions. In this case, it is an example that the electrode leads are led from a same side of the container, therefore the folding line is on the opposed side to the side where the electrode leads are led out, in this case the opposed side is one side along the width direction of the cuboid. In the following embodiments, examples that electrode leads are led from opposing sides of a container will be introduced.

Figure 1B:
Figure 7:
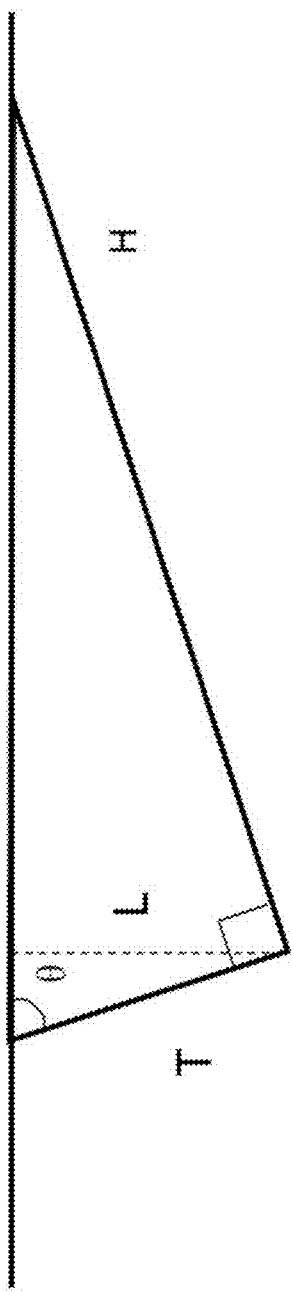
FIG. 7 is a schematic view showing a size relationship of the container formed in the first embodiment by the method of the present invention.

FIG. 7 is a size relationship diagram of one container portion of FIG. 6. As shown in FIG. 7, compared with the prior art in FIG. 1, since the aluminum layer is extended along a gentle slope, therefore the extended area of the aluminum layer is not limited to local parts, instead, it is uniformly extended on the whole. Moreover, since a container is divided into two container portions to be molded respectively, in each container portion, the area of the wall perpendicular to the molding surface is only half of the original one, that is to say, for a same molding depth, the mass of aluminum used is also half of the original one. With integration of the above two factors, it makes the molding depth L by the molding method of the present invention already surpass the molding depth in the prior art, in the case of using same mass of material.

Further, according to the geometric relationship, there is: $T = H \times L/\sqrt{H^2 - L^2} = L/\sin\theta$. Since $\sin\theta$ is less than 1, hence T is greater than L, thus the depth of the container in the height direction is further deepened, therefore, compared to the prior art described with reference to FIG. 1 and FIG. 2, it has greatly increased the thickness limit of a battery, thereby the battery capacity is improved.

In addition, it is known from the top view of FIG. 6(c) that, upon folding the formed regions, thermal welding the substrate around the container portions, and bending the thermal welding part at both costal positions of the container portion to container portions, there will occur that prominent substrate part is generated from sizes of the container portions, therefore, slight adjustment is needed, for example, to bend toward the battery side so as to conform to the battery size.

As shown in FIG. 6(b), through processing of the first embodiment, the parting surfaces of both the upper and lower container portions, that is, the respective molding surfaces of the upper and lower container portions, become the plane where the diagonals of two walls along the width direction of the container exist, that is, the plane passing through the diagonals of the rectangles in the drawing along a direction of perpendicular to the plane of the paper. Certainly, it can be understood by the skilled in the art that, beside the lateral surfaces along the width direction, the parting surfaces may also intersect in some other surface as required.

The Second Embodiment

FIG. 8(a)-FIG. 8(d) are schematic views of a container formed in the second embodiment by the method of the present invention. The second embodiment is the same as the first embodiment in that, it also divides a container into two container portions having triangular sections. However, the second embodiment is different from the first embodiment in that: the two container portions in the first embodiment are oriented in the same direction, whereas the two container portions in the second embodiment are respectively rotated 90 degrees in opposite directions on the surface direction of the substrate on the base of the first embodiment, that is, there is an orientation difference of 180 degrees between the tow container portions, and the sectional triangles of the tow container portions are respectively parallel to and equally distanced from the dividing line which divides the substrate into two container portions. In other words, in the second embodiment, the two container portions are folded from one side along the length direction of the cuboid container. Since the second embodiment is used for the case that the positive and negative electrodes of the battery cell are led from opposite directions of the container, hence the folding line is on one side along the length direction of the rectangular container.

This method sets a distance between the two container portions, which is advantageous for improving the battery capacity, in the case that both positive and negative wires led from the battery unit is not on the same side but on opposite sides of the battery unit.

Since the thermal welding area along the width direction is only at one side, instead of at both sides, therefore it can improve the battery capacity corresponding to the one side of the substrate thickness.

Seen from the side where the two container portions are connected, compared with the embodiment described above in which the molding depth in one side is shallow and the molding depth in the other side is deep, the molding depth formed by the method of this embodiment is different in each positions of the connecting side. Moreover, in each specific positions of the connecting side, the sum of the molded depth of the two container portions is always a constant value, therefore, the two container portions are adjacent, and both can achieve a certain extent of molding depth, and are not prone to generate gaps and cracks. Therefore, the risk of deepening the molding depth is the same as other methods, and it can improve the molding limit and thus improve the battery capacity.

In addition, as shown in FIG. 8(a), in order to reduce as far as possible the distance between the two container portions (i.e., reduce the mass of material used) and to improve the molding depth, the walls on both sides of the respective container portions along the length direction of the container are also formed to be close to each other and inclined to the molding surface, and at least the opposing walls of the two container portions are respectively inclined to the respective container portion side. However, it is known from the above description that, provided that the interval between the two container portions is properly set (widened), then the walls on both sides of each container portion, or the walls at least on the opposing side of the other container portion, also may be perpendicular to the molding surface, thus the purpose of deepening the molding depth is achieved. Certainly, the interval will be a surplus size left in the container after the two container portions are folded, therefore, a slight adjustment is needed likewise. Through such treatment, the container after molding becomes a geometry object which is, on the basis of a cuboid, uplifted toward the width direction at diagonals in the two walls on both sides along the length direction. Certainly, the uplift also may be eliminated by vacuum pumping or the like operations, after a battery cell is mounted.

As shown in FIG. 8(d), through the processing of the second embodiment, it is like the first embodiment that, the parting surfaces of both the upper and lower container portions, that is, the respective molding surfaces of the upper and lower container portions, become the plane where the diagonals of two walls along the width direction of the container exist, that is, the plane passing through the diagonals of the rectangles in the drawing along a direction of perpendicular to the plane of the paper. Certainly, it can be understood by the skilled in the art that, beside the lateral surfaces along the width direction, the parting surfaces may also be set in some other surface as required.

The Third Embodiment

Figure 9A:
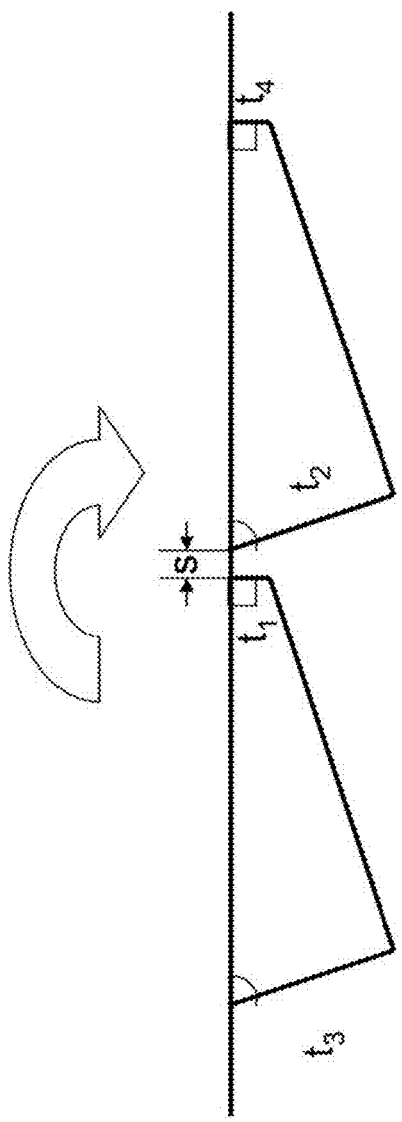
FIG. 9(a) and FIG. 9(b) are schematic views of a container formed in the third embodiment by the method of the present invention.
Figure 9B:
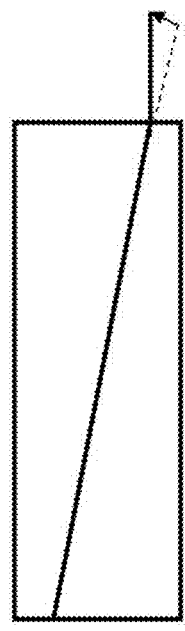

FIG. 9(a) and FIG. 9(b) are schematic views of a container formed in the third embodiment by the method of the present invention. The third embodiment is different from the first embodiment in that: the sections of the two container portions are quadrangles.

In the third embodiment, the molding surface is not the plane which is in the diagonal direction of the rectangle in the above-described first embodiment and which is perpendicular to the plane of the paper, but is the plane which is at a certain angle to the plane perpendicular to the height direction of the cuboid container and which is within the range of the sides in height. Thus, with such a molding surface, a container is divided into two container portions, namely containing parts. In addition, the molding surface is not limited to intersect with the cuboid container within the range of the sides in height, and it also may intersect with the cuboid container within the range of the sides in length.

It is known from FIG. 9(a) that, the two container portions respectively have sections in quadrilateral shapes, and in each quadrangle, the angles on one side of the edge at the molding surface are approximately a right angle and an acute angle, thus in the third embodiment, in each container portion, there are also two walls that are inclined to the molding surface.

It is known from the size relationship diagram of FIG. 9(a) that, $t_1+t_2=t_3+t_4=T$, $t_1<t_2$, $t_3>t_4$ and $t_1 \neq t_3$, $t_2 \neq t_4$, wherein, T is the size in the height direction of the container, and $t_1$, $t_2$, $t_3$, $t_4$ are the lengths of the two sides of respective quadrilaterals along the left-to-right direction of the drawing. Certainly, the size relationships between $t_1$ and $t_2$ as well as between $t_3$ and $t_4$ also may be reversed. In addition, it should be noted that, the above presents the size relationships in an ideal state, however, since the container is formed in a manner of stretching molding such as stamping, etc., in the actual manufacturing, the edges of $t_1$ and $t_4$ must be perpendicular to the molding surface in order to be able to remove the metal mold such as a stamping head, but this results in that $t_1$ and $t_3$ as well as $t_2$ and $t_4$ are not parallel, hence in the actual container portions, the $t_1$ and $t_4$ parts will protrude slightly toward the outside of the container, consequently a vacuum pumping operation is needed after a battery cell is mounted into the container. Since in the case that the substrate is a laminated-type packaging material and the thin film of the substrate is flexible, the protruded part may be pulled close toward the container through a vacuum pumping. Certainly, in the case that $t_1$ and $t_2$ are very small, the above equations come into existence approximately.

Like the first embodiment, upon folding the formed regions, thermal welding around the container portions, and bending the thermal welding part at both costal positions of the container portion to container portions, there will occur that prominent substrate part is generated from sizes of the container portions, therefore, slight adjustment is needed so as to conform to the battery size.

In addition, since the opposing surfaces of the two container portions have only one side in a gentle slope, in order to guarantee a certain molding depth, it is better to set a distance "s" between the two container portions. Thus, in the case that the two container portions are folded, the "s" part will be folded and be left as a surplus part, causing the size in the length direction inaccurate. Therefore, it is necessary to be bent or slightly adjusted so as to reduce the size in the length direction. Although "s" is no less than 0, it is preferable that 4 mm≥s≥0 mm, more preferably 2 mm≥s≥0 mm, and after molding and folding the substrate, the size of the surplus part in the length direction s'=s/2, thus there is: when 4 mm≥s≥0 mm, then 2 mm≥s'≥0 mm; and when 2 mm≥s≥0 mm, then 1 mm≥s'≥0 mm. Especially, when 1 mm≥s'≥0 mm, the "s" part of the substrate will be adsorbed back during vacuum pumping inside the battery, thus making the surplus size disappear.

In addition, the "s" part may be taken as a part of a wall of the container, in that case, $t_1+t_2+s=t_3+t_4=T$, $t_1<t_2$, $t_3>t_4$, s>0 mm. Certainly, the size relationships between $t_1$ and $t_2$ as well as between $t_3$ and $t_4$ also may be reversed. Please note that, as described above, the equation also presents an example in an ideal situation. At this moment, since a side wall has an extra length "s", gaps will be created on both sides of that wall along the width direction of the container, and the gaps needs to be adjusted, which will be described specifically herein below.

In the third embodiment, the molding limit is smaller than that in the first embodiment, however, by properly setting the distance "s" between the container portions, the molding limit can be properly maintained. In addition, the location of thermal welding part is more close to the center in the height direction of the container, therefore, the amount of slight-adjustment is reduced, and the reliability (water intrusion, welding strength, and solvent region) of the thermal welding part is improved.

In addition, in the two embodiments as described above, the parts where the molding surface intersect with the geometry object of the container are all within the range of the height of the cuboid, however, said parts also may exceed the range of the height and thus intersect in the two surfaces constituted by the length and width. Moreover, the molding surfaces may also not be perpendicular to the central longitudinal section along the lengthwise direction, since the purpose of the present invention can be achieved, as long as it is ensured that, in both the upper and lower container portions, there exist a wall that is incline to the molding surface.

In addition, the second embodiment described above presents an example in which two container portions are formed in different orientations compared with the first embodiment. Herein, as a modification of the third embodiment, although not shown, it may also form two container portions in a similar manner, thus making the folding line to be on one side along the length direction of the rectangular container.

As shown in FIG. 9(b), through the processing of the third embodiment, it is different from the first and the second embodiments that, the parting surfaces of both the upper and lower container portions, that is, the respective molding surfaces of the upper and lower container portions, become the two planes perpendicular to the length direction of the cuboid, that is, the planes perpendicular to the paper but not passing through the diagonals thereof. Certainly, it can be understood by the skilled in the art that, beside the lateral surfaces along the width direction, the parting surfaces may also intersect in some other surface as required.

The Fourth Embodiment

Figure 10A:
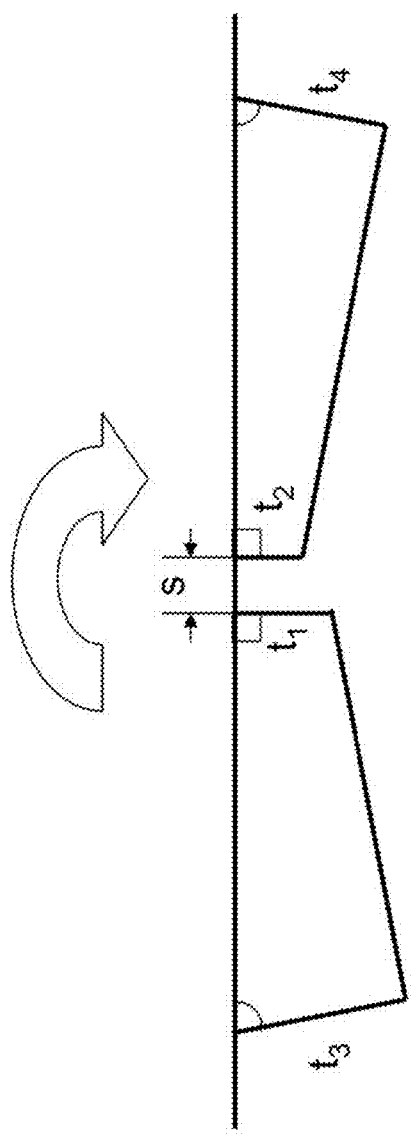
FIG. 10(a) and FIG. 10(b) are schematic views of a container formed in the fourth embodiment by the method of the present invention.
Figure 10B:
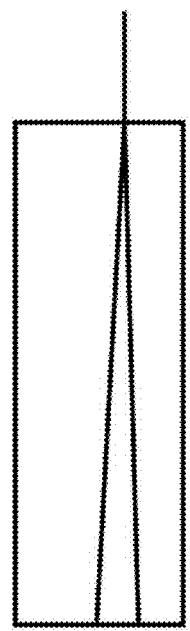

FIG. 10(a) and FIG. 10(b) are schematic views of a container formed in the fourth embodiment by the method of the present invention. The fourth embodiment is the same as the third embodiment in that, the sections of the two container portions are quadrangles; and the fourth embodiment is different from the third embodiment in that: as shown in FIG. 10(a), in the two quadrilaterals of the sections of the two container portions, the two edges close to each other are respectively shorter than the two edges in a distal end; moreover, as shown in FIG. 10(b), the molding surface which forms the two container portions respectively becomes two surfaces in the cuboid container, such two surfaces intersect at one wall along the width direction of the cuboid, and intersect with the other wall along the width direction of the cuboid, and are not parallel to any one of the walls. Certainly, such two molding surfaces would be one surface before the two container portions are folded, and will be respectively at a certain angle to the central transversal section along the lengthwise direction after the two container portions are folded.

The reason for why the above-described structure is adopted is that: in this embodiment, the substrate material corresponding to the distance "s" set between the two container portions will serve as a part of the corresponding sidewall and thus is formed in the container. Compared with the second embodiment, the distance "s" is increased.

It is known from FIG. 10(a) that, compared to the case that the distance "s" is not set, $t_1$ and $t_2$ at both sides of "s" may not necessarily be set too deep, accordingly, they can be supplemented by the substrate material corresponding to the distance "s", thus the defects caused by the stretching may be reduced. On the other hand, by setting the distance "s" larger, compared to the case that the distance "s" is not set, the stretching area of the aluminum layer is increased; contrarily, it is possible to make the molding depth of $t_1$ and $t_2$ deeper than those in the case that the distance "s" is not set. Because of these two reasons, the size in the height direction of the battery may be increased, which facilitates to improve the battery capacity, and at the same time to reduce the occurrence of defects.

Since the "s" serves as a part in the height direction of the container, as shown in FIG. 11(c), surplus substrate material is produced at the thermal welding part on both sides along the width direction of the container portions. Such part protrudes to the left direction in the drawing during the thermal welding, causing size error to be produced in the length direction of the container, thus slight-adjustment is needed to remove it.

In addition, since the "s" serves as a part in the height direction of the container, the above-mentioned problem is also produced in this embodiment, that is, because the substrate is bent two times, thus gaps will be created in the walls on both sides of the wall where "s" exists, along the width direction of the container (FIG. 10(c)). As shown in FIG. 11(d), in order to eliminate the gaps and maintain the size in the height direction of the container, during the thermal welding of the surfaces on both sides as described above, the corresponding walls in the two opposing container portions have to be stretched, to compensate for the shortage in a part (in the drawing, the broken lines are the edges of the side surfaces before stretching). Then, since the two container portion are stretched and as shown in FIG. 11(c), therefore the protrusions formed at the left side by the substrate part for bonding around the container portions, are slightly adjusted such as being cut off. Certainly, with the amount of stretching increases, the load caused on the substrate will also increase, which could lead to defects such as holes or cracks. Thus, although "s" is greater than 0 mm, it is preferable that 4 mm≥s≥0 mm, more preferably 2 mm≥s≥0 mm. If "s" exceeds 4 mm, then defects in appearance such as wrinkles begin to occur. Under some conditions, if "s" exceeds 6 mm, then holes and cracks begin to occur. Sometimes, it also causes defects in the thermal welding. The above has introduced the method of compensating the gaps by stretching, however, it is known by the skilled in the art that, the gaps also may be enclosed by other simple methods such as using an insulating tape.

As shown in FIG. 10(b), unlike the above described embodiments, through processing of the fourth embodiment, the parting surfaces of both the upper and lower container portions, that is, the respective molding surfaces of the upper and lower container portions, are actually not in one plane; moreover, such two surfaces are respectively perpendicular to the side surfaces of the cuboid, that is the plane of the paper, and intersect at one surface along the length direction, and intersect with the opposite surfaces thereof, respectively. Certainly, it can be understood by the skilled in the art that, beside the lateral surfaces along the width direction, the parting surfaces may also intersect in some other surface as required.

In addition, in the embodiments as described above, it is explained on the case that the sections of both the upper and lower container portions are triangles or quadrilaterals, but all the solution schemes should belong the scope of protection of the present invention, provided that: in these solution schemes, by making the parting surface to intersect with the cuboid in a manner of being not parallel to any surface, thus in each container portion, there exist a surface that is inclined to the parting surface, i.e. the molding surface.

The Fifth Embodiment

FIG. 12 is a schematic view of a container formed in the fifth embodiment by the method of the present invention. Unlike the previous embodiments, the fifth embodiment describes the examples in which the formed container is a container in a shape of a cylinder, and in this embodiment, the section of each container portion is a quadrangle. Since the molding surface is taken by a similar method as the third embodiment, that is: the planes where the two molding surface exist superposed in said cylinder, and are both perpendicular to a section plane passing through the circle centers of the two bottom surfaces of said cylinder, and not parallel nor perpendicular to said two bottom surfaces, therefore, the detailed description thereof is omitted. In addition, since in the case of cylindrical containers, in each container portion, besides the walls that are inclined to the molding surface, there is also a curved wall that is a part of the cylinder. According to the principle of the present invention, it is clear to the skilled in the art that, the curved walls also allows the substrate thin film to be sufficiently stretched.

In addition, as shown in the left view of FIG. 12, in this embodiment, it can be known that: the shape of the larger end surface in the container portions is not a circle, but a shape in which a rectangle is superimposed semi-circle, wherein, the long sides of the rectangle are the same as the diameter of the semi-circle, and the sides in width of the rectangle has such a length that it can couple with the other container portion and thus pack the battery cell. As to the reasons for such molding, it is also explained in the above description, that is: if it is fabricated into a circular or almost circular shape, then the metal mold can not be removed therefrom and the battery cell can not be mounted into it either. Thus, the two end surfaces of the container, which should be in a cylindrical shape after the two container portions are folded, will not be formed into a circular shape. Therefore, likewise, vacuum pumping is needed after a battery cell is placed into the container, so that the container shrinks to the size of the battery cell, thus the formation of the cylindrical shape is ultimately completed.

Through the processing of the fifth embodiment, it is similar to the third embodiment that: the parting surfaces of both the upper and lower container portions, that is, the respective molding surfaces of the upper and lower container portions, become the surfaces of the container that are perpendicular to the central section of the container but not passing through the diagonals thereof. Certainly, it can be understood by the skilled in the art that, beside the bottom surfaces, the parting surfaces may also intersect in some other surface as required. Moreover, through processing of the fifth embodiment, in each container portion, there is at least one end surface in a plane that is inclined to the molding surface.

The Sixth Embodiment

FIG. 13(a)-FIG. 13(d) are schematic views of a container formed in the sixth embodiment by the method of the present invention. The sixth embodiment is different from the fifth embodiment in that: the two container portions in the sixth embodiment are respectively rotated 90 degrees in opposite directions on the surface direction of the substrate, that is, there is an orientation difference of 180 degrees between the tow container portions. That is to say, the sixth embodiment is also used for the case that the electrode terminals are led from opposite directions along the lengthwise direction. Except for the above-described difference, the sixth embodiment is completely the same as the fifth embodiment, thus the detailed description thereof is herein omitted.

Figure 13B:
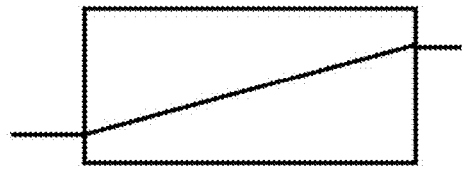
FIG. 13(a)-FIG. 13(d) are schematic views of a container formed in the sixth embodiment by the method of the present invention.
Figure 13D:
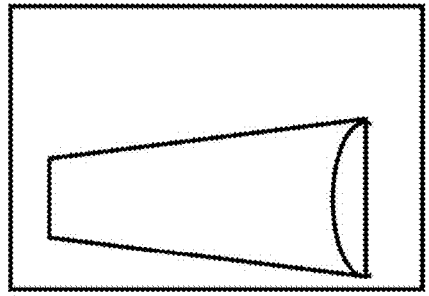
Figure 13A:
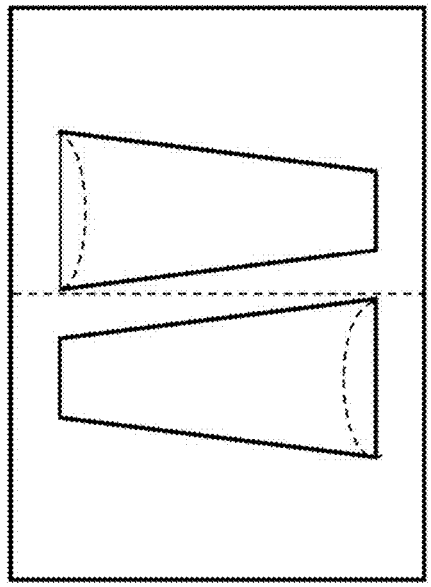
Figure 13C:
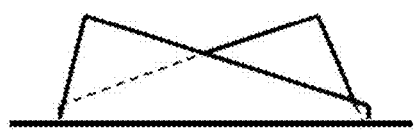

As shown in FIG. 13(d), through the processing of the sixth embodiment, it is similar to the fifth embodiment that: the parting surfaces of both the upper and lower container portions, that is, the respective molding surfaces of the upper and lower container portions, become the surfaces of the container that are perpendicular to the central section of the container but not passing through the diagonals thereof. Certainly, it can be understood by the skilled in the art that, beside the bottom surfaces, the parting surfaces may also intersect in some other surface as required.

Other Embodiments

In addition, in the above-described first to fourth embodiments, the forming methods and the structures of a rectangular container are introduced, but it can be understood by the skilled in the art that: for cylindrical containers, the difference between them and rectangular containers only lies in the shapes or traveling directions as well as angles of the metal mold, and the molding surface of each container portion in them are taken by the same method as those in the first to the fourth embodiments. Therefore, for the illustration of them, appropriate reference may be made to the illustrations of the first to the sixth embodiment, and herein the redundant explanation thereof is omitted.

Figure 14A:
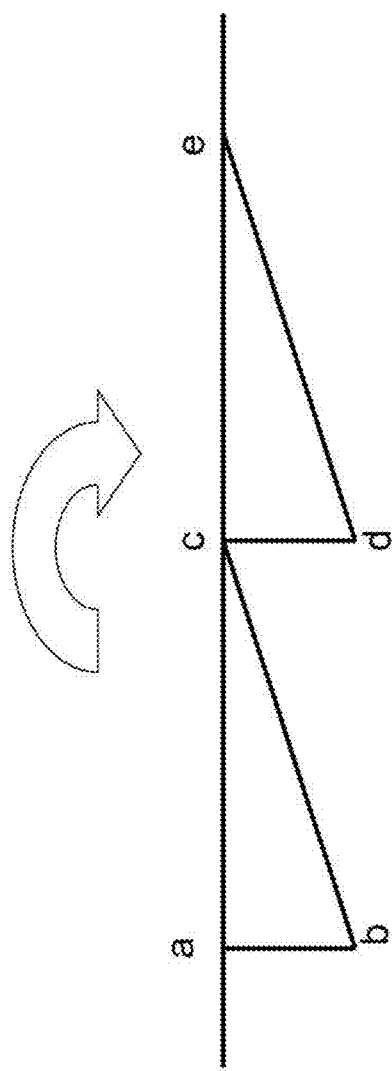
FIG. 14(a) and FIG. 14(b) are schematic views of a container formed in another embodiment by the method of the present invention.
Figure 14B:
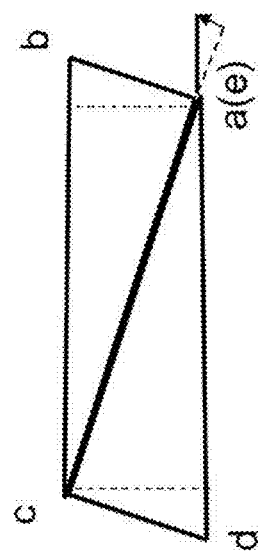

In addition, as shown in FIG. 14(a) and FIG. 14(b), through the molding method of the present invention as introduced in FIG. 5 (a)-FIG. 5 (c), it is also possible, in each container portion, to form only one wall that is inclined to the molding surface, so that the two formed container portions after being folded form an approximate parallelogram, as shown in FIG. 14(b). Through vacuum pumping after a battery cell is installed, the two inclined sides contract to the positions shown by the broken lines in FIG. 14(b), thus a rectangular container is formed. Compared with the above-described embodiments, since in each container portion there is only one surface that is inclined to the molding surface, therefore, the structure of the stretching head is simple, and the effect of an improved molding limit also can be achieved.

It can be known with reference to Table 1 that, the first embodiment as an example is compared with the three existing ways in the prior art. Through the comparison as below, it can be known that, compared to the first and second existing ways, the molding limit and battery thickness has significantly improved; and compared to the third existing way, the molding limit and battery thickness does not change significantly, but, since two container portions are formed with one sheet-like substrate, thus, compared to the third existing way, the positioning accuracy and volume energy density can be improved.

TABLE 1

| Molding Method | No. | Molding Limit L/mm | Molding Angle θ/° | Battery Thickness T/mm |
| --- | --- | --- | --- | --- |
| The First Embodiment | 1 | 10.7 | 74 | 11.2 |
| The First Existing Way | 1 | 10.7 | 90 | 10.3 |
| The Second Existing Way | 1 | 3.8 | 90 | 7.8 |
| The Third Existing Way | 1 | 10.8 | 78 | 11.3 |

The battery cell containers of the present invention has been introduced in the above description, mainly with rectangular and cylindrical battery cell containers as examples, but the shapes thereof also may be other ones besides the above-described shapes; as long as the methods adopt inclined-surface-molding methods to improve the molding limit, they all belong to the scope of protection of the present invention. Other shapes are such as oval shape, wavy shape, and the like shape that can be molded and can change a shape of a component within the range of the shape. Embodiments of the above-mentioned shapes, which can be obtained by appropriate changing shapes, or traveling directions as well as angles of the stretching head, also belong to the scope of protection of the present invention.

In addition, although not specifically described in above, the batteries which adopt the battery cell containers formed by the method of the present invention, as well as the electronic devices in which said batteries are adopted to supply power to the main bodies thereof, are all within the scope of protection of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery, comprising:
a battery cell, and
a battery cell container substantially cylindrical in shape, wherein the battery cell container includes a first folded container portion and a second folded container portion, each provided in a thin sheet,
wherein each folded container portion includes a first wall inclined toward a plane where the thin sheet exists, wherein the first wall does not intersect the plane where the thin sheet exists, wherein the plane where the thin sheet exists is superposed into each folded container portion, wherein the plane superposed in the first container portion is perpendicular to a section plane passing through a circle center of a second wall and a circle center of a third wall, and wherein the plane in the first container portion is not parallel nor perpendicular to the second wall or to the third wall.

2. The battery according to claim 1, wherein a line formed at the intersection of the plane in the first container with the section plane is a diagonal of the section plane.

3. The battery according to claim 1, wherein a folding line between the first folded container portion and the second folded container portion is parallel to a central axis direction of a cylinder formed by the first folded container portion and the second folded container portion.

4. The battery cell container according to claim 1, wherein a folding line between the first folded container portion and the second folded container portion is perpendicular to a central axis direction of a cylinder formed by the first folded container portion and the second folded container portion.

5. The battery according to claim 1, wherein a mating plane of the first folded container portion and the second folded container portion is neither parallel nor perpendicular to the second wall or to the third wall, and the mating plane is perpendicular to the section plane passing through the circle centers of the second and third walls.

6. An electronic device, comprising:
an electronic device main body and a battery supplying power to the electronic device main body, wherein,
the battery comprises:
a battery cell, and
a battery cell container including two folded container portions molded in a thin sheet,
wherein, in each container portion, among the planes where the walls of each container exist, a first plane is inclined to the plane where the thin sheet exists and the wall where the first plane exists does not intersect the plane where the thin sheet exists, and
wherein the battery cell container includes a second wall that intersects and is perpendicular to the plane where the thin sheet exists, and a third wall that intersects the plane where the thin sheet exists.

7. The electronic device according to claim 6, wherein the battery cell container is in an unfolded state.

8. The electronic device according to claim 7, wherein the battery cell container further includes a fourth wall and a fifth wall that are each perpendicular to the plane where the thin sheet exists at the third wall.

9. The electronic device according to claim 6, wherein the battery cell container is in a folded state.

10. The electronic device according to claim 9, wherein the battery cell container further includes a fourth wall and a fifth wall that each intersects the plane where the thin sheet exists at an internal angle greater than 90 degrees at the third wall.

11. A battery, comprising:
a battery cell, and
a battery cell container substantially cylindrical in shape, wherein the battery cell container includes a first folded container portion and a second folded container portion, each provided in a thin sheet,
wherein each folded container portion includes a first wall inclined toward a plane where the thin sheet exists, wherein the first wall does not intersect the plane where the thin sheet exists, and wherein a folding line between the first folded container portion and the second folded container portion is parallel to a central axis direction of a cylinder formed by the first folded container portion and the second folded container portion.

12. A battery, comprising:
a battery cell, and
a battery cell container substantially cylindrical in shape, wherein the battery cell container includes a first folded container portion and a second folded container portion, each provided in a thin sheet,
wherein each folded container portion includes a first wall inclined toward a plane where the thin sheet exists, wherein the first wall does not intersect the plane where the thin sheet exists, and wherein a folding line between the first folded container portion and the second folded container portion is perpendicular to a central axis direction of a cylinder formed by the first folded container portion and the second folded container portion.

13. A battery, comprising:
a battery cell, and
a battery cell container, wherein the battery cell container includes a first folded container portion and a second folded container portion, each provided in a thin sheet,
wherein each folded container portion includes a first wall inclined toward a plane where the thin sheet exists, wherein the first wall does not intersect the plane where the thin sheet exists, and wherein a mating plane of the first folded container portion and the second folded container portion is neither parallel nor perpendicular to a second wall or to a third wall, and the mating plane is perpendicular to a section plane passing through the circle centers of the second and third walls.

14. A battery, comprising:
a battery cell, and
a battery cell container, wherein the battery cell container includes a first folded container portion and a second folded container portion, each provided in a thin sheet,
wherein each folded container portion includes a first wall inclined toward a plane where the thin sheet exists, wherein the first wall does not intersect the plane where the thin sheet exists, and wherein the battery cell container further includes a second wall that intersects and is perpendicular to the plane where the thin sheet exists, and a third wall that intersects the plane where the thin sheet exists.

15. The battery according to claim 14, wherein the battery cell container is in an unfolded state.

16. The battery according to claim 15, wherein the battery cell container further includes a fourth wall and a fifth wall that are each perpendicular to the plane where the thin sheet exists at the third wall.

17. The battery according to claim 14, wherein the battery cell container is in a folded state.

18. The battery according to claim 17, wherein the battery cell container further includes a fourth wall and a fifth wall that each intersects the plane where the thin sheet exists at an internal angle greater than 90 degrees at the third wall.

* * * * *